United States Patent [19]

Laugerud et al.

[11] 4,301,748
[45] Nov. 24, 1981

[54] ARRANGEMENT IN FLUIDIZED BED INCINERATOR

[75] Inventors: Sverre Laugerud; Herman Etnestad; Frode Pedersen, all of Gjøvik, Norway

[73] Assignee: O. Mustad & Don A/S, Gjovik, Norway

[21] Appl. No.: 114,643

[22] Filed: Jan. 23, 1980

[30] Foreign Application Priority Data

Jan. 25, 1979 [NO] Norway .................. 790250

[51] Int. Cl.³ .................. F23G 5/00; F27B 15/00
[52] U.S. Cl. .................. 110/245; 432/58; 34/57 C
[58] Field of Search .......... 122/40; 110/245; 432/58, 15; 34/57 C

[56] References Cited

U.S. PATENT DOCUMENTS

| | | | |
|---|---|---|---|
| 2,351,991 | 6/1944 | McClain | 52/764 |
| 3,480,265 | 11/1969 | Deve | 432/58 |
| 3,910,755 | 10/1975 | Syska | 432/58 |
| 4,019,705 | 4/1977 | Habuda et al. | 248/228 |
| 4,088,079 | 5/1978 | Herzog | 248/228 |
| 4,226,830 | 10/1980 | Davis | 432/58 |

FOREIGN PATENT DOCUMENTS 2738438 3/1978 Fed. Rep. of Germany.

*Primary Examiner*—Henry C. Yuen
*Attorney, Agent, or Firm*—Finnegan, Henderson, Farabow, Garrett & Dunner

[57] ABSTRACT

The constriction plate of a fluidized bed incinerator is divided into a plurality of smaller perforated plate elements which are attached to an underlying frame structure with a mutual spacing corresponding to the heat expansion which the elements are subjected to during operation of the incinerator. The plate elements have bent rims so as to rest upon the support along sharp edges and are resiliently attached to the support. Attachment of the plate elements is effected by attachment means threaded through holes in the elements and embracing the bent area of the plate elements in the upper area thereof, the attachment means at their lower ends having a threaded area for screw connection to a resilient attachment piece. The attachment means may be arranged in pairs, each pair at their lower ends being attached to a common resilient attachment piece.

6 Claims, 2 Drawing Figures

ARRANGEMENT IN FLUIDIZED BED INCINERATOR

BACKGROUND OF THE INVENTION

1. Field of the Art

The present invention relates to an arrangement in an incinerator in which a fuel is burnt in a fluidized bed of refractory particles and the fluidizing air is supplied from a wind box through a perforated constriction plate supporting the fluidized bed.

2. Statement of Prior Art

Such incinerators which are also referred to as whirl pool incinerators, comprise a perforated constriction plate or nozzle plate supporting a bed of sand which is fluidized by air blowing through the perforations of the constriction plate. The constriction plate is a very important part of the incinerator structure, the object thereof being to distribute the fluidizing air when this is blown into the fluidizing bed at the underside thereof. The constriction plate is located in the incinerator plant so that on the lower side of the plate fluidizing air is blown into and pressed through the plate, whereas on the upper side of the plate there takes place a combustion at temperatures of 600°-900° C. Thus, substantial temperature differences will develop on either side of the plate, a fact which involves that in connection with perforated constriction plates of thermo-proof steel there will occur a heat expansion, so that the plate is bent upwardly towards the hot side.

Additionally, there also exists the possibility of unequal heating, because the rim zone of the constriction plate has a lower temperature than that which occur at the center area of the plate, a fact which contributes to an unequal heat expansion including the consequence of further bending of the plate.

Such deformations of the constriction plate entail that the fluidizing air is unevenly distributed across the constriction plate, which in turn implies an uneven height of the fluidizing bed and difficult fluidizing conditions.

Besides, large problems will occur in those cases where infeed systems for liquid fluid through the restriction plate are used, the distortions of the constriction plate inter alia effecting a deformation of the infeed system and a spraying of the liquid fuel below the plate rather than thereabove. The object of the present invention is to find a solution to the above-mentioned problems. In other words, the invention is to the effect of providing an arrangement in an incinerator having a fluidized bed, in which the problems occuring due to the heat expansion of the restriction plates during operation of the incinerator, are reduced to a minimum.

SUMMARY OF THE INVENTION

In an incinerator of the type indicated in the preamble this object is, according to the invention, achieved in that the constriction plate is divided into a plurality of smaller perforated plate elements which are attached to an underlying frame structure with a mutual spacing substantially corresponding to the heat expansion.

In such an arrangement the plate elements are guaranteed a free expansion, the plates during heating being subjected to a minimum buckling.

To ensure the maintenance of the necessary sealing around the rims of the plate elements each plate element is provided with bent rims and rests upon the support along a sharp edge, the elements being resiliently attached to the support. A suitable way of attaching the elements may involve that the elements in the area of the bent rims are provided with holes through which attachment bolts can be threaded, the attachment bolts at their upper end having a hook-shaped area which embraces the rim area and at their lower end having a threaded area for screw connection to an underlying resilient attachment piece.

In the following the invention will be further described, reference being had to the drawing which illustrates an embodiment of the arrangement according to the invention.

DESCRIPTION OF A PREFERRED EMBODIMENT

Figure 1:
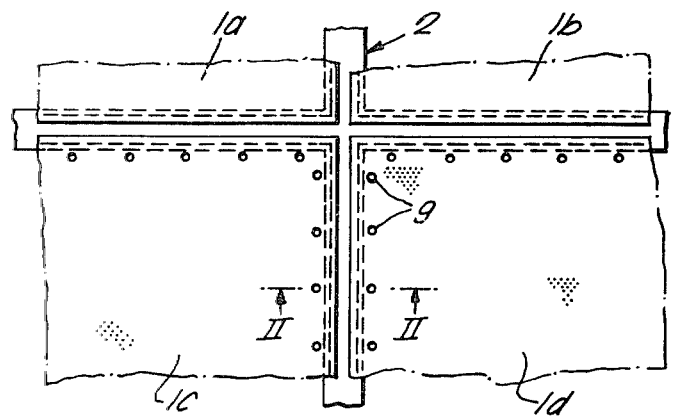
FIG. 1 is a fragment of a compartmented constriction plate according to the invention.

In FIG. 1 there is illustrated how a constriction plate or nozzle plate which is to cover an area of e.g. $3 \times 3$ m, is divided in for example 16 lesser plate elements having a dimension of approximately $0.75 \times 0.75$ m. In FIG. 1 there is shown a fragment of four such elements or sections, which are designated $1a$, $1b$, $1c$ and $1d$, respectively.

Figure 2:
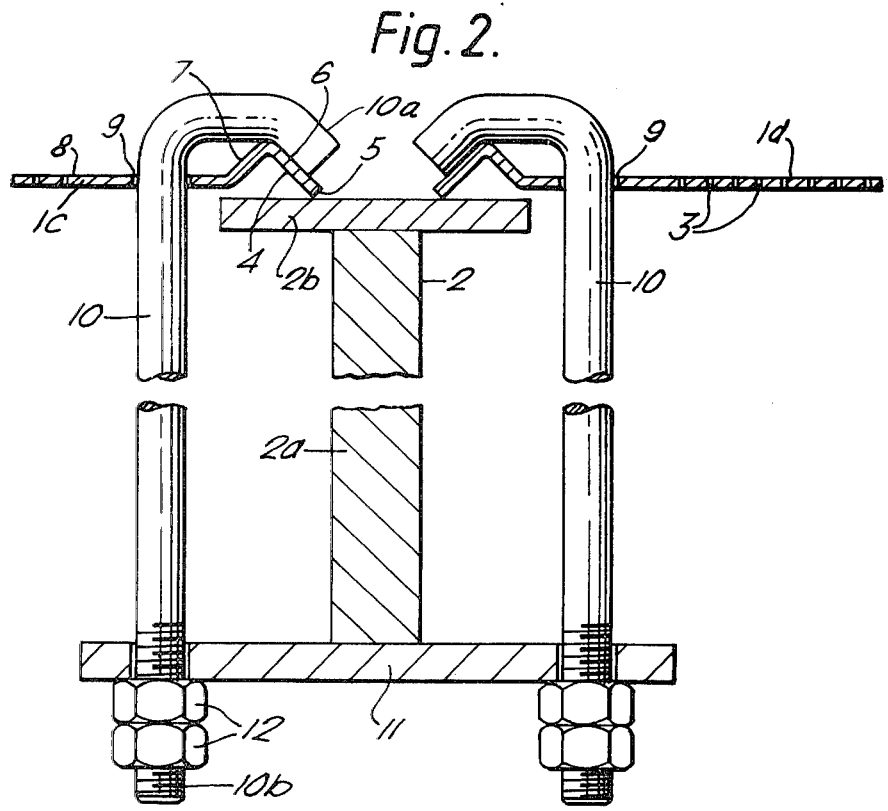
FIG. 2 is on a larger scale a section taken along line II—II in FIG. 1.

The plate elements rest on a grid-shaped frame structure which is generally designated by 2. As illustrated in FIG. 2, the frame structure 2 may be composed of a first, larger flat bar $2a$, which at its upper edge supports a flat bar $2b$ welded thereto.

Each plate element is provided with perforations or small holes through which air can flow from an underlying wind box (not illustrated) and up through a fluidized bed (not illustrated) wherein the combustion takes place.

In FIG. 2 there is in the plate element $1d$ indicated a series of perforations 3 and the perforations can be arranged so tightly that 10.000 holes are found per $m^2$.

During the operation these perforations or apertures are to be held open for even distribution of the fluidizing air during operation of the incinerator. Through the plate elements there can also be passed infeed nozzles or similar for the fuel to be burnt or for additional air supply. For the sake of simplicity such nozzles are deleted from the drawing.

By arranging the various plate elements with a mutual spacing corresponding to the heat expansion taking place during heating, it is achieved that each plate element is able to expand freely and independently of the other elements.

However, it is important that during operation there is all the time maintained an effective sealing between the plate elements $1a$–$1d$ and the flat bar $2b$ provided underneath the plate elements for the support thereof. The plate elements are therefore provided with bent rims and rest on the support $2b$ along a sharp edge. As illustrated in FIG. 2, the plate elements of the illustrated embodiment are provided with a double bent rim portion 4 comprising an area 6 which slopes upwardly from the outer edge 5 and merges into a downwardly inclining area 7, which joins the main area 8 of the plate section. The first obliquely bent area 6 protrudes below the main area 8 so as to rest on the support along the outer edge 5. In the area of the bent rim area 4 the plate elements $1a$–$1d$ are provided with holes 9 through which attachment bolts 10 can be threaded, the attachment bolts 10 at their upper ends being provided with a hook-shaped area 10a which embraces the rim portion 6 of the plate elements. At the lower end each bolt 10 is provided with a threaded area 10b for screw connection to an underlying resilient attachment piece 11 which not necessarily has to be attached to the flat bar 2a.

The holes 9 are made so large that the mounting of the bolts 10 may be carried out without difficulties, but not larger than forming between the wall of the hole and the bolt a slit which does not give a substantially larger air flow area than adjoining perforated plate areas.

When tightening the nuts 12 on the threaded area 10b of the bolts 10 the hook-shaped area 10a will be pressed towards the bent area 4 of the plate elements and pull the latters along the rim zones against the flat bar 2b. The bolts may for example be mounted with a center spacing of approx. 100 mm, the bolts of one element being arranged opposite of the attachment means of the adjacent element, so that oppositely arranged bolts are attached in a common attachment piece 11.

Because of the bending of the nozzle or plate elements there is achieved, aside from a strengthening of the rim areas of the elements as well as a good abutment area for the attachment bolts, a through-flow of fluidizing air also in the area of the bent areas, which entails a substantial reduction of the shielding effect due to the flat bar 2b.

Because the attachment bolts 10 are tightened in a resilient attachment piece 11 the plate elements will continuously be pressed towards the support with a suitable pressure, irrespective of their displacement along the support 2b due to heat expansion. During displacement of the plate elements towards each other the bolts will follow the movement of the elements due to their inherent flexibility and especially due to the resilient narrow attachment piece 11. Other clamping devices wherein for example the clamping element is directly in contact with the supporting surface, may also be contemplated.

To give the individual elements a larger stiffness and to control the direction of displacement in case of deformation during operation, the elements are cross-bent in a downward direction, so that the heat movement which may occur, will impart to the elements an increased sag in the downwards direction. The deformation of the plates will then not be in conflict with possible infeed nozzles which are passed through the plate elements.

In the areas where the plate elements rest against the outer rim zone of the incinerator, and where the outer element edges are not covered by a flange gasket, a bending of the rim areas will normally not be necessary since the plate edges should move freely out and in under the gasket between flanges.

The bending of the plate elements may be carried out in other ways than the one described above. For example, the rim zones of the elements may be bent only once or bent with rounded surfaces. The main object is that the elements are given such a shape in the rim zone that advantages with respect to strength and sealing are achieved.

What we claim is:

1. An incinerator having a perforated constriction plate for communicating fluidizing fluid to a fluidized bed of refractory materials supported by the plate, the improvement comprising:
   a plurality of small perforated plate elements constituting said constriction plate, said plate elements being spaced apart by open areas for permitting free expansion of said elements under the heat of the fluidized bed;
   a framework for supporting said plate elements, the rims of said elements resting on support surfaces of said framework for sliding movement thereon; and
   means for securing the rims of the elements to the support surfaces for inhibiting flow of refractory materials between said elements and said support surfaces, and for permitting relative movement of said elements and support surfaces during expansion and contraction.

2. The constriction plate of claim 1 wherein the elements have bent rims, said rims having a sharp edge for resting directly on said support surfaces.

3. The constriction plate of claim 2 wherein the means for securing the rims of the elements to the support surface include;
   holes along the bent rims, each said hole dimensioned to receive a bolt;
   attachment bolts to fit through said holes, the bolts having a hook-shaped area at one end to fit over the bent rim and a threaded portion at their opposite end for screw connection;
   attachment pieces below said elements for connection of said bolts, the bolts and attachment pieces holding said rims resiliently onto said support surface.

4. The incinerator of claim 2 or 3 wherein the plate elements have a double-bent rim, said rim comprising a first area which slopes upwardly from the sharp edge, said sharp edge being below the main body of the element, said first area merging into a downwardly inclined area which then merges into the main area of the element.

5. The incinerator of claim 1 or 2 wherein each of the plurality of elements is cross-bent in the downward direction.

6. The incinerator of claim 4 wherein the attachment bolts of adjacent elements are aligned and attached to said resilient attachment piece in pairs.

* * * * *

UNITED STATES PATENT AND TRADEMARK OFFICE
CERTIFICATE OF CORRECTION

PATENT NO. : 4,301,748

DATED : November 24, 1981

INVENTOR(S) : Sverre Laugerud et al.

It is certified that error appears in the above—identified patent and that said Letters Patent is hereby corrected as shown below:

On the title page,
the name of the Assignee should be changed from

"O. Mustad & Don A/S" to --O. Mustad & Son A/S--.

Signed and Sealed this

Fifteenth Day of June 1982

[SEAL]

*Attest:*

*Attesting Officer*

GERALD J. MOSSINGHOFF

*Commissioner of Patents and Trademarks*